(12) United States Patent
Huang

(10) Patent No.: US 8,882,279 B2
(45) Date of Patent: Nov. 11, 2014

(54) ILLUMINATION SYSTEM AND PROJECTION DEVICE COMPRISING THE SAME

(75) Inventor: June-Jei Huang, Taoyuan Hsien (TW)

(73) Assignee: Delta Electronics, Inc. (TW)

( * ) Notice: Subject to any disclaimer, the term of this patent is extended or adjusted under 35 U.S.C. 154(b) by 323 days.

(21) Appl. No.: 13/404,502

(22) Filed: Feb. 24, 2012

(65) Prior Publication Data

US 2012/0218529 A1    Aug. 30, 2012

(30) Foreign Application Priority Data

Feb. 25, 2011   (TW) .............................. 100106331 A

(51) Int. Cl.
| | | |
|---|---|---|
| *G03B 21/28* | (2006.01) | |
| *G03B 21/26* | (2006.01) | |
| *H04N 5/74* | (2006.01) | |
| *F21S 10/00* | (2006.01) | |
| *F21V 13/14* | (2006.01) | |
| *G03B 21/20* | (2006.01) | |
| *H04N 9/31* | (2006.01) | |
| *G02B 26/00* | (2006.01) | |
| *G02B 26/08* | (2006.01) | |
| *G03B 33/12* | (2006.01) | |

(52) U.S. Cl.
CPC ............ *F21S 10/007* (2013.01); *F21S 10/005* (2013.01); *F21V 13/14* (2013.01); *G03B 21/2033* (2013.01); *G03B 21/2066* (2013.01); *G03B 21/28* (2013.01); *H04N 9/315* (2013.01); *H04N 9/3197* (2013.01); *G02B 26/008* (2013.01); *G02B 26/0833* (2013.01); *G03B 21/2013* (2013.01); *G03B 21/204* (2013.01); *G03B 33/12* (2013.01); *H04N 9/3114* (2013.01); *H04N 9/3152* (2013.01); *H04N 9/3164* (2013.01)
USPC ................ 353/102; 353/94; 353/99; 348/771

(58) Field of Classification Search
CPC ...... F21S 10/007; F21S 10/005; F21V 13/14; G03B 21/2033; G03B 21/2066; G03B 33/12; G03B 21/28; H04N 9/315; H04N 9/3161; H04N 9/3197; G02B 26/008; G02B 26/0833
USPC ........................ 353/102, 98, 99, 94; 348/771
See application file for complete search history.

(56) References Cited

U.S. PATENT DOCUMENTS

| | | | |
|---|---|---|---|
| 7,547,114 B2 | 6/2009 | Li et al. | |
| 7,651,243 B2 | 1/2010 | McGuire, Jr. et al. | |

(Continued)

FOREIGN PATENT DOCUMENTS

| | | |
|---|---|---|
| CN | 101836160 A | 9/2010 |
| TW | 200807135 A | 2/2008 |

OTHER PUBLICATIONS

Chinese Office Action for Chinese Application No. 201110050451.2, mailing date of Dec. 30, 2013 with English Translation.

*Primary Examiner* — William C Dowling
*Assistant Examiner* — Magda Cruz
(74) *Attorney, Agent, or Firm* — Cantor Colburn LLP

(57) ABSTRACT

An illumination system and a projection device comprising the same are provided. The projection device comprises an imaging system and the illumination system. The illumination system comprises a first light source, a dichroic element, at least one condensing element, a rotary wheel and a light integrating element. The first light source provides a first wave band light, and the rotary wheel has at least one wave band transforming area and a reflecting area. After passing through the dichroic element and the at least one condensing element, the first wave band light will be focused onto the at least one wave band transforming area to be transformed into a second wave band light or be focused onto the reflecting area that will be reflected. The second wave band light and the reflected first wave band light will be focused on the light integrating element by the at least one condensing element.

24 Claims, 7 Drawing Sheets

(56) References Cited

U.S. PATENT DOCUMENTS

2009/0034284 A1* 2/2009 Li et al. ......................... 362/554
2009/0187234 A1 7/2009 Meyer et al.
2012/0127435 A1* 5/2012 Kitano et al. ................... 353/20

* cited by examiner

ILLUMINATION SYSTEM AND PROJECTION DEVICE COMPRISING THE SAME

This application claims priority to Taiwan Patent Application No. 100106331 filed on Feb. 25, 2011, the disclosures of which are incorporated by reference herein in their entirety.

CROSS-REFERENCES TO RELATED APPLICATIONS

Not applicable.

BACKGROUND OF THE INVENTION

1. Field of the Invention

The present invention relates to an illumination system and a projection device comprising the illumination system. More particularly, the present invention relates to an illumination system that performs wavelength transformation on a particular wave band light and a projection device using the illumination system.

2. Descriptions of the Related Art

Over recent years, with the continuous advancement of technologies for manufacturing projection devices, lightweight and slim projection devices have become the mainstream product in the market. The demands of new and improved products in the market have led to the continuous improvement of the design of projection devices. Accordingly, manufacturers of projection devices must develop various smaller projection devices with a high efficiency and better imaging quality to satisfy the needs in the market.

Referring to FIG. 1 a projection device 1 disclosed in U.S. Pat. No. 7,547,114. An illumination system 11 of the projection device 1 uses a single light source to project light to a color wheel 112. The color wheel 112 has green and red phosphor materials for reflecting or transforming a blue light emitted by a blue solid-state light source 111 (e.g., a light emitting diode (LED) or a laser) into a green light or a red light respectively. The green light and the red light are then provided to a projection device. However, such a projection device has too low of a luminous efficiency and wastes a large amount of light energy.

Referring to FIG. 2, there is shown another illumination system 21 of a conventional projector 2. Instead of using a single light source to project light to a color wheel, the illumination system 21 uses a blue solid-state light source 211, a red LED 212, and a wavelength transforming element 213 with a green phosphor material. Light rays that are reflected or transformed are focused into an imaging system for imaging. However, the blue light can be coupled with the green light and the red light that are formed through transformation only after being reflected multiple times, so the light energy of the blue light will be significantly attenuated due to the multiple reflections. Moreover, the light emitted by the LED is of a scattered nature, so a plurality of light condensing elements must be used to condense the light to improve luminous efficiency. Consequently, the projector 2 must be made to have a large internal volume to contain the light condensing elements, and this is in contradiction to the demands for lightweight and slim products in the market.

Accordingly, it is important to provide a projection device which features both a highly efficient illumination system and a small volume, as well as be able to reduce light energy waste and avoid color non-uniformity of a displayed image.

SUMMARY OF THE INVENTION

An objective of the present invention is to provide an illumination system, which can be applied to a projection device to achieve miniaturization of the projection device and improve the luminous efficiency.

To achieve the aforesaid objective, the present invention provides a projection device, which comprises an imaging system and an illumination system. The illumination system comprises a first light source, a dichroic element, at least one light condensing element, a rotary wheel and a light integrating element. The first light source provides a first wave band light. The light condensing element has an optical axis. The rotary wheel has at least one wave band transforming area and a reflecting area, and is disposed on the first side of the optical axis. The light integrating element is disposed on the second side of the optical axis. The light integrating element and the rotary wheel are optically conjugate about the optical axis. The first wave band light is emitted through the dichroic element and the at least one light condensing element, and focuses on the at least one wave band transforming area or the reflecting area. When the first wave band light focuses on the at least one wave band transforming area, the first wave band light is transformed into a second wave band light, and the second wave band light is focused on the light integrating element by the at least one light condensing element. Furthermore, when the first wave band light focuses on the reflecting area, the first wave band light is reflected by the reflecting area, and is focused on the light integrating element by the at least one light condensing element.

According to the above descriptions, the illumination system of the present invention allows for optimized use of the light source to increase the luminance of images displayed by the projection device using the illumination system of the present invention, and can also reduce non-uniformity in the color of the images. Meanwhile, the projection device that uses the illumination system of the present invention can also prevent the overuse of energy sources, and have a decreased volume of the projection devices since it does not require complicated illumination components.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

In the following descriptions, the present invention will be explained with reference to embodiments thereof. The present invention relates to an illumination system and a projection device using the illumination system. The projection device may be a device with projection and display functions such as a digital light processing (DLP) projection display or a liquid crystal display (LCD) projection display. It shall be appreciated that in the following embodiments and the attached drawings, the description of the embodiments is only for the purpose of illustration rather than limitation. Meanwhile, in the following embodiments and attached drawings, elements not directly related to the present invention are omitted from depiction; and dimensional relationships among individual elements in the attached drawings are illustrated only for ease of understanding but not to limit the actual scale.

Figure 1:
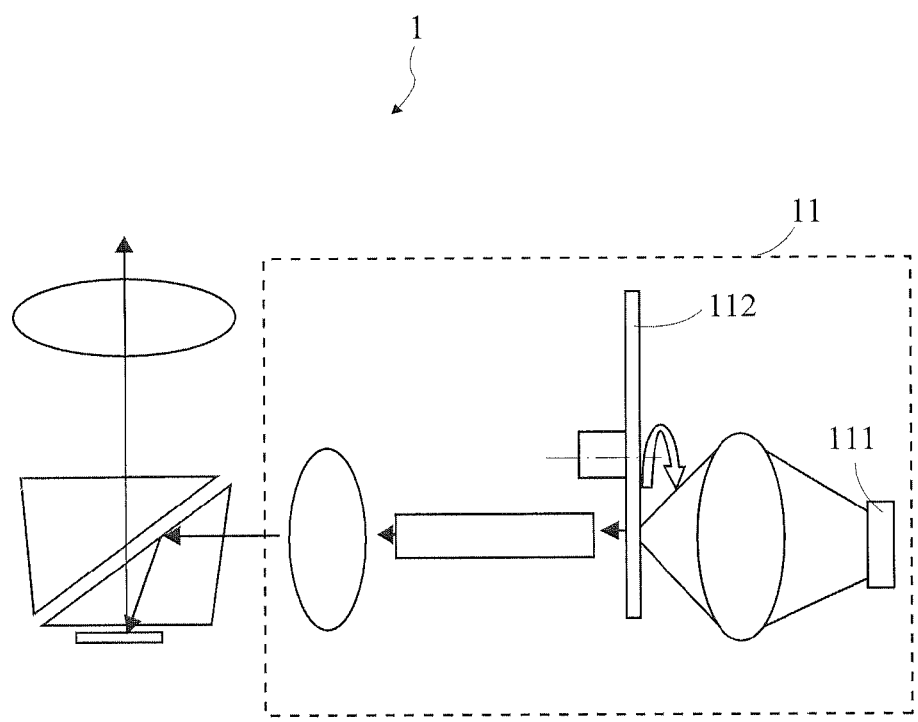
FIG. 1 is a schematic view of a conventional projection device.
Figure 2:
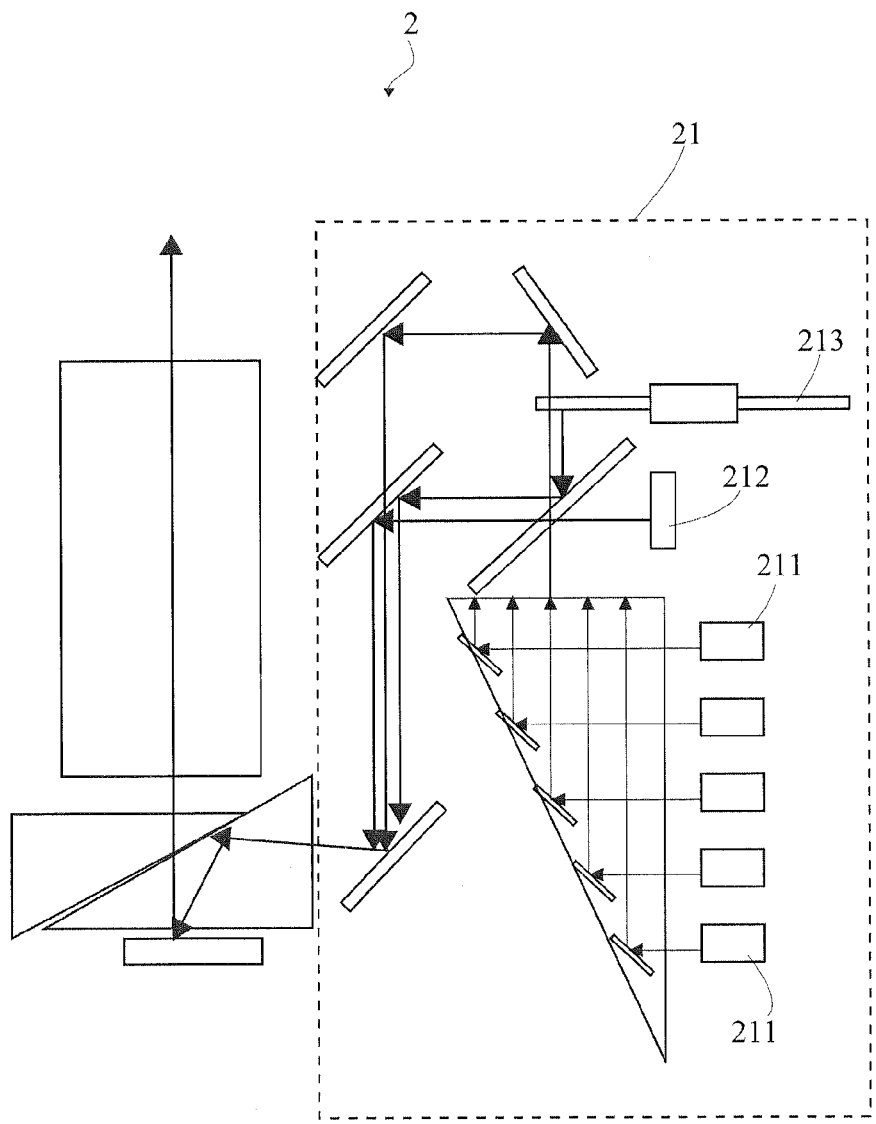
FIG. 2 is a schematic view of another conventional projection device.
Figure 3:
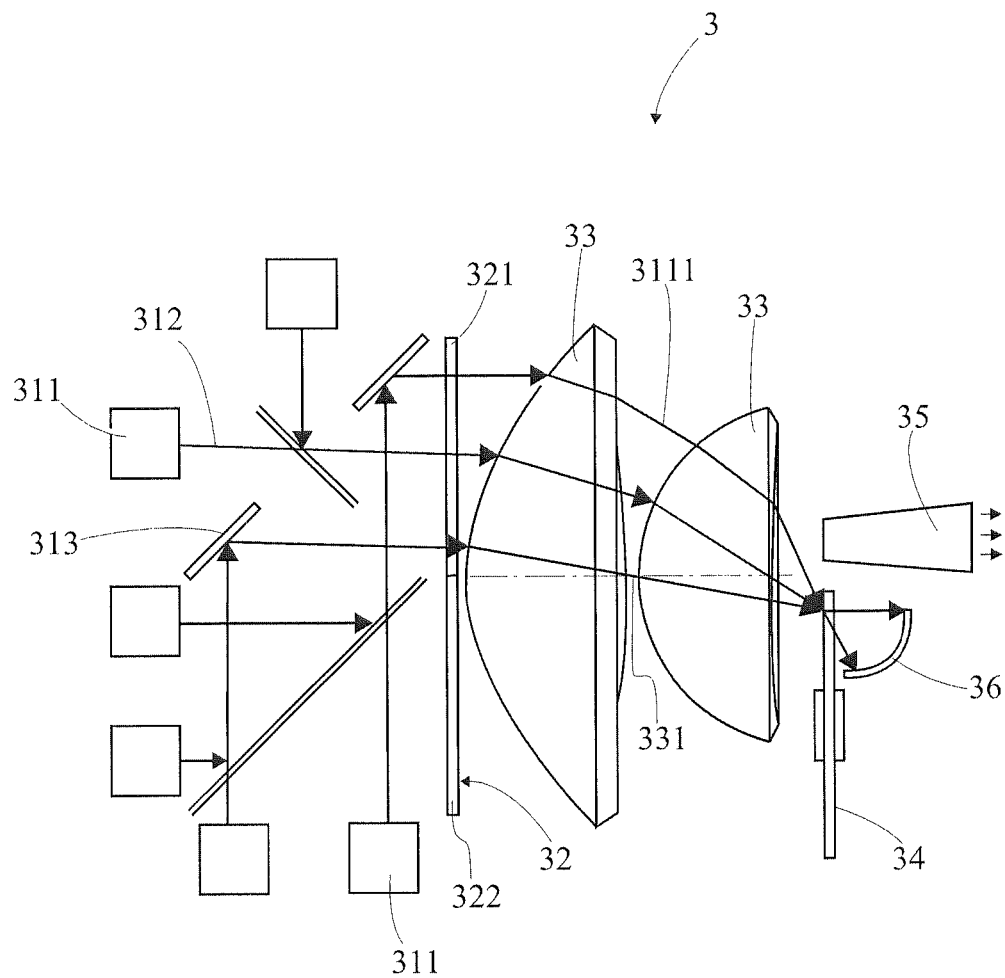
FIG. 3 is a schematic view of a projection device according to the first embodiment of the present invention.

The first embodiment of the present invention is an illumination system 3 for use in a projection device (not shown), a schematic view of which is shown in FIG. 3. The projection device comprises the illumination system 3 and an imaging system (not shown). The illumination system 3 of the projection device is adapted to provide a light and output the light to the imaging system so that the imaging system forms the light into an image for projection. The illumination system 3 according to the first embodiment of the present invention comprises a first light source 31, a dichroic element 32, two light condensing elements 33, a rotary wheel 34, a light integrating element 35 and a light recycling element 36.

Figure 4:
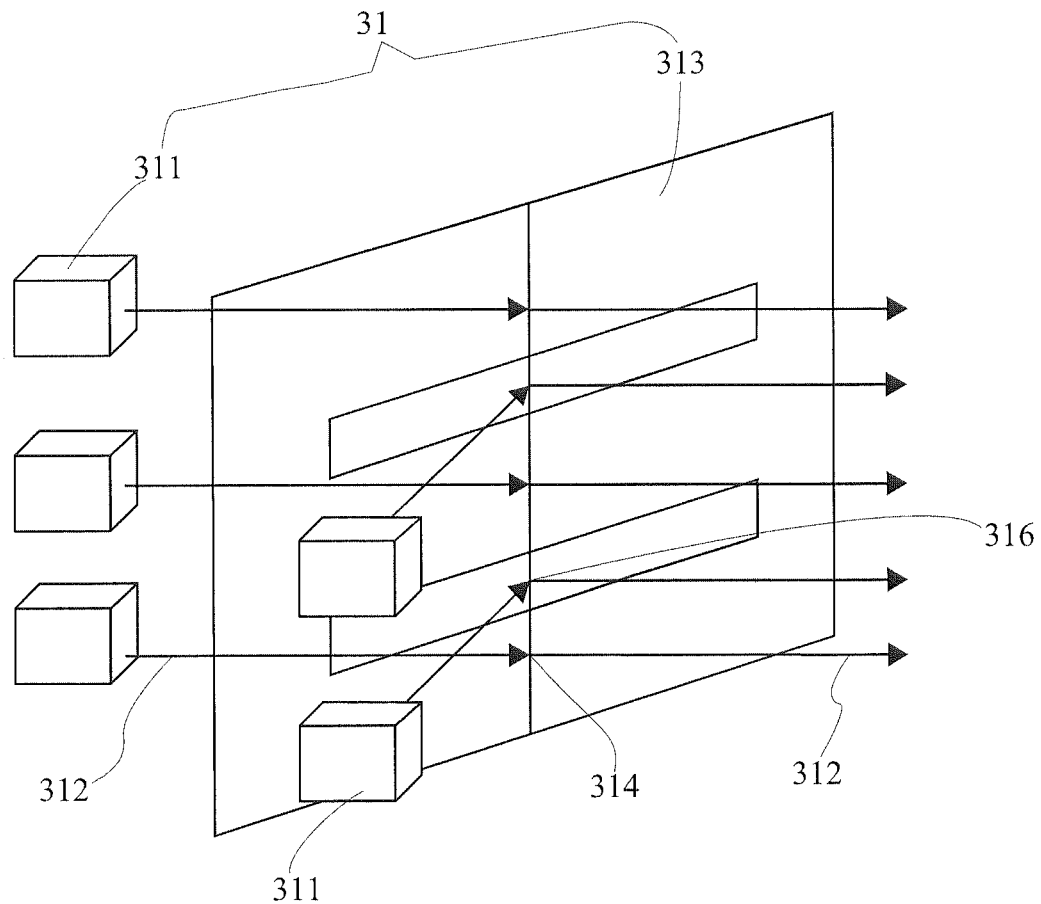
FIG. 4 is a schematic view of a first light source of the projection device according to the first embodiment of the present invention.

Referring to FIG. 4 together, the first light source 31 comprises a plurality of blue laser light sources 311 and a plurality of reflecting mirrors 313, and is adapted to provide a plurality of first wave band lights 312 within the blue wave band. FIG. 4 shows a schematic view of the first light source 31 in FIG. 3. Through a transparent portion 314 and reflecting portion 316 in each of the reflecting mirrors 313, the rays of the first wave band lights 312 can be concentrated towards the same direction to enhance the light intensity of the first wave band lights 312. However, it shall be appreciated that the arrangement of the first light source of the present invention is not merely limited to what is described above, and people skilled in the art may also use other illumination architectures instead.

The dichroic element 32 has a dichroic portion 321 and a reflecting portion 322. The dichroic portion 321 allows the first wave band lights 312 to pass therethrough but reflects a second wave band light 3111 and a third wave band light 3112. The reflecting portion 322 reflects the first wave band lights 312, the second wave band light 3111 and the third wave band light 3112. In this embodiment, the second wave band light 3111 is within the green wave band, and the third wave band light 3112 is within the red wave band. In other words, the first wave band lights 312 (blue lights) directly pass through the dichroic portion 321 or are reflected by the reflecting portion 322 when being projected to the dichroic element 32; the second wave band light 3111 (green light) or the third wave band light 3112 (red light) is reflected by both the dichroic portion 321 and the reflecting portion 322 when being projected to the dichroic element 32.

The two light condensing elements 33 have an optical axis 331 in common. In this embodiment, each of the light condensing elements 33 is a convex lens. In other embodiments of the present invention, there may be another number of light condensing elements and the light condensing elements may be of various forms or made of various materials as will be readily appreciated by people skilled in the art.

Figure 5:
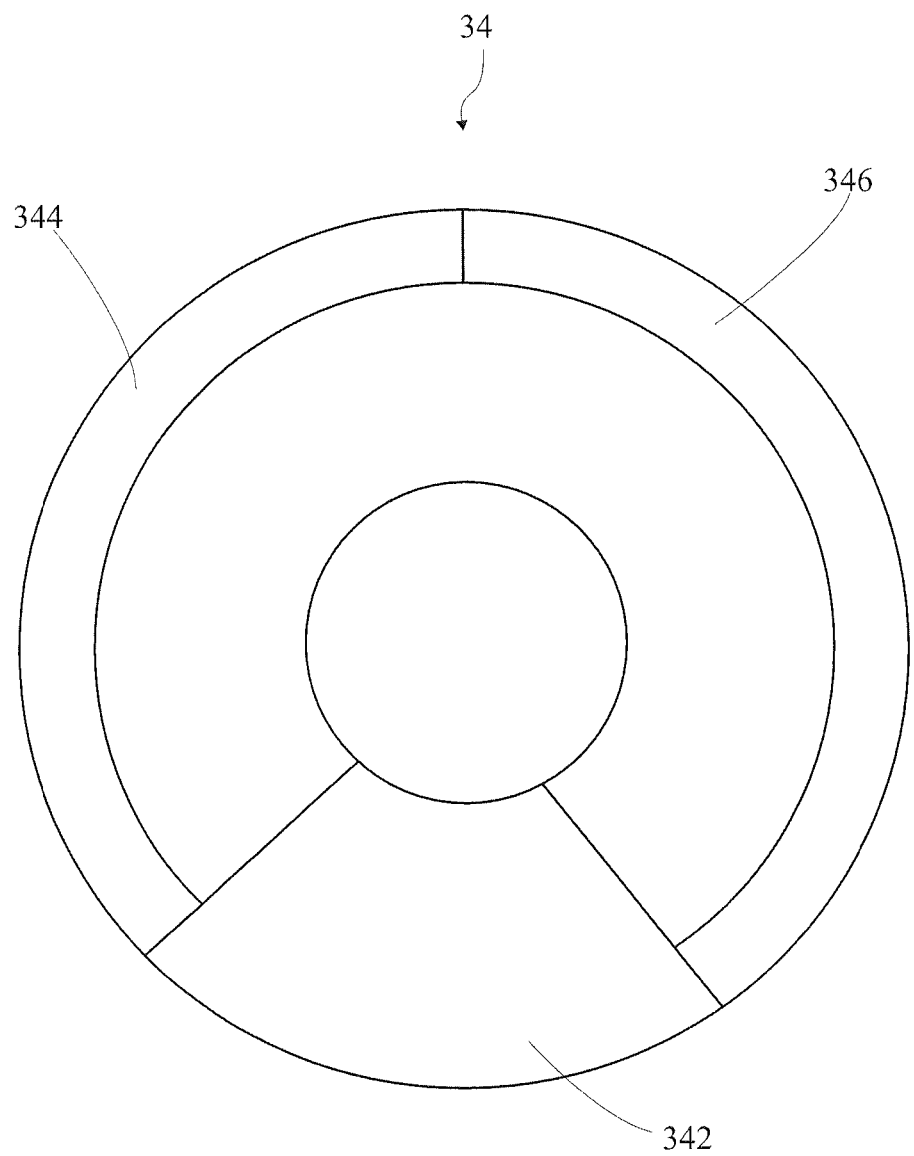
FIG. 5 is a schematic view of a rotary wheel of the projection device according to the first embodiment of the present invention.

Referring to FIG. 3 and FIG. 5 together, the rotary wheel 34 is disposed on the first side of the optical axis 331. The rotary wheel 34 comprises a circular glass sheet, and has a first wave band transforming area 344, a second wave band transforming area 346 and a reflecting area 342 defined on a surface thereof. The first wave band transforming area 344 is formed by coating a green phosphor material on the glass surface to transform each of the first wave band lights 312 into the second wave band light 3111. The second wave band transforming area 346 is formed by coating a red phosphor material on the glass surface to transform each of the first wave band lights 312 into the third wave band light 3112. On the opposite side of the glass in these two areas is a coating film for transmitting the first wave band lights 312 and reflecting the second wave band light 3111 and the third wave band light 3112. The reflecting area 342 is adapted to reflect the first wave band lights 312. The second wave band light 3111 and the third wave band light 3112 that are obtained through transformation, and the first wave band lights 312 that are reflected are all focused by the light condensing elements 33. In the present invention, the reflecting area may be formed by coating a reflective material, or may be made of a reflecting mirror directly. Furthermore, in this embodiment, the area ratio of the first wave band transforming area 344, the second wave band transforming area 346 and the reflecting area 342 relative to each other on the rotary wheel 34 is 3:3:2; and the area ratio of these areas on the rotary wheel may also be adjusted appropriately by people skilled in the art depending on the requirements of the light source intensity and the color performance.

The light integrating element 35 is disposed on the second side of the optical axis 331. The light integrating element 35 and the rotary wheel 34 are optically conjugate about the optical axis 331. More specifically, an entrance (not shown) of the light integrating element 35 is optically conjugate to a light focusing portion of the rotary wheel 34, and the light focusing portion is one of the first wave band transforming area 344, the second wave band transforming area 346 and the reflecting area 342. The light integrating element 35 may be a light tunnel or a light integration rod.

Hereinafter, the operation mechanism of the illumination system 3 of this embodiment will be described in detail.

When the first wave band lights 312 emitted by the blue laser light sources 311 of the first light source 31 are all guided by the reflecting mirrors 313 into the same direction and then pass through the dichroic portion 321 of the dichroic element 32 to be focused by the light condensing elements 33 onto the reflecting area 342 of the rotary wheel 34, the first wave band lights 312 are reflected by the reflecting area 342 to pass through the light condensing elements 33 and are then reflected by the reflecting portion 322 of the dichroic element 32. Afterwards, the first wave band lights 312 are focused by the light condensing elements 33 to the light integrating element 35 for homogenization. Finally, the homogenized first wave band lights 312 are provided by the light integrating element 35 to the imaging system for imaging.

The rotary wheel 34 and the light integrating element 35 are optically conjugate about the optical axis 331, and the first wave band lights 312 provided by the blue laser light sources 311 have a small divergence angle and are concentrated. Therefore, after passing through the light condensing elements 33, the first wave band lights 312 reflected by the reflecting area 342 of the rotary wheel 34 do not travel towards the dichroic portion 321 but only travel to the reflecting portion 322 to be reflected, and are then focused onto the light integrating element 35 being optically conjugate to the rotary wheel 34. In other words, the first wave band lights 312 focused on the reflecting area 342 is optically conjugated to the first wave band light 312, which is later focused on the entrance of the light integrating element 35.

Similarly, when the first wave band lights 312 emitted by the blue laser light sources 311 of the first light source 31 are all guided by the reflecting mirrors 313 into the same direction and then pass through the dichroic portion 321 to be focused by the light condensing elements 33 onto the first wave band transforming area 344 of the rotary wheel 34, each of the first wave band lights 312 is transformed into the second wave band light 3111. The second wave band light 3111 returns through the light condensing elements 33, and is then reflected by the dichroic portion 321 and the reflecting portion 322 of the dichroic element 32. Afterwards, the second wave band light 3111 is focused by the light condensing elements 33 onto the light integrating element 35 for homogenization. Finally, the homogenized second wave band light 3111 is provided by the light integrating element 35 to the imaging system for imaging. More specifically, the first wave band lights 312 focused on the first wave band transforming area 344 is optically conjugated to the second wave band light 3111, which is later focused on the entrance of the light integrating element 35.

It shall be particularly appreciated herein that after the first wave band lights 312 are focused onto the first wave band transforming area 344, a small portion of the first wave band lights 312 pass through the first wave band transforming area 344 to result in loss of the light; therefore, the light recycling element 36 is disposed behind the rotary wheel 34 to reflect and focus the first wave band lights 312, which pass through the first wave band transforming area 344, back to the first wave band transforming area 344 to be transformed also into the second wave band light 3111. The second wave band light 3111 then passes through the light condensing elements 33 and is then reflected by the dichroic portion 321 and the reflecting portion 322. Afterwards, the second wave band light 3111 is focused by the light condensing elements 33 onto the light integrating element 35 to be provided to the imaging system for imaging. Thereby, the light can be recycled to avoid loss of light. In this embodiment, the light recycling element 36 is a spherical reflecting mirror.

Likewise, when the first wave band lights 312 emitted by the blue laser light sources 311 of the first light source 31 are all guided by the reflecting mirrors 313 into the same direction and pass through the dichroic portion 321 to be focused by the light condensing elements 33 onto the second wave band transforming area 346 of the rotary wheel 34, each of the first wave band lights 312 is transformed into the third wave band light 3112. The third wave band light 3112 then returns through the light condensing elements 33 and is reflected by the dichroic portion 321 and the reflecting portion 322 of the dichroic element 32. Afterwards, the third wave band light 3112 is focused by the light condensing elements 33 onto the light integrating element 35 for homogenization. Finally, the homogenized third wave band light 3112 is provided by the light integrating element 35 to the imaging system for imaging. More specifically, the first wave band lights 312 focused on the second wave band transforming area 346 is optically conjugated to the third wave band light 3112, which is later focused on the entrance of the light integrating element 35.

Finally, the first wave band lights 312 within the blue wave band, the second wave band light 3111 within the green wave band and the third wave band light 3112 within the red wave band are outputted by the light integrating element 35 to the imaging system so that the imaging system forms the first wave band lights 312, the second wave band light 3111 and the third wave band light 3112 into an image for projection and display.

Figure 6:
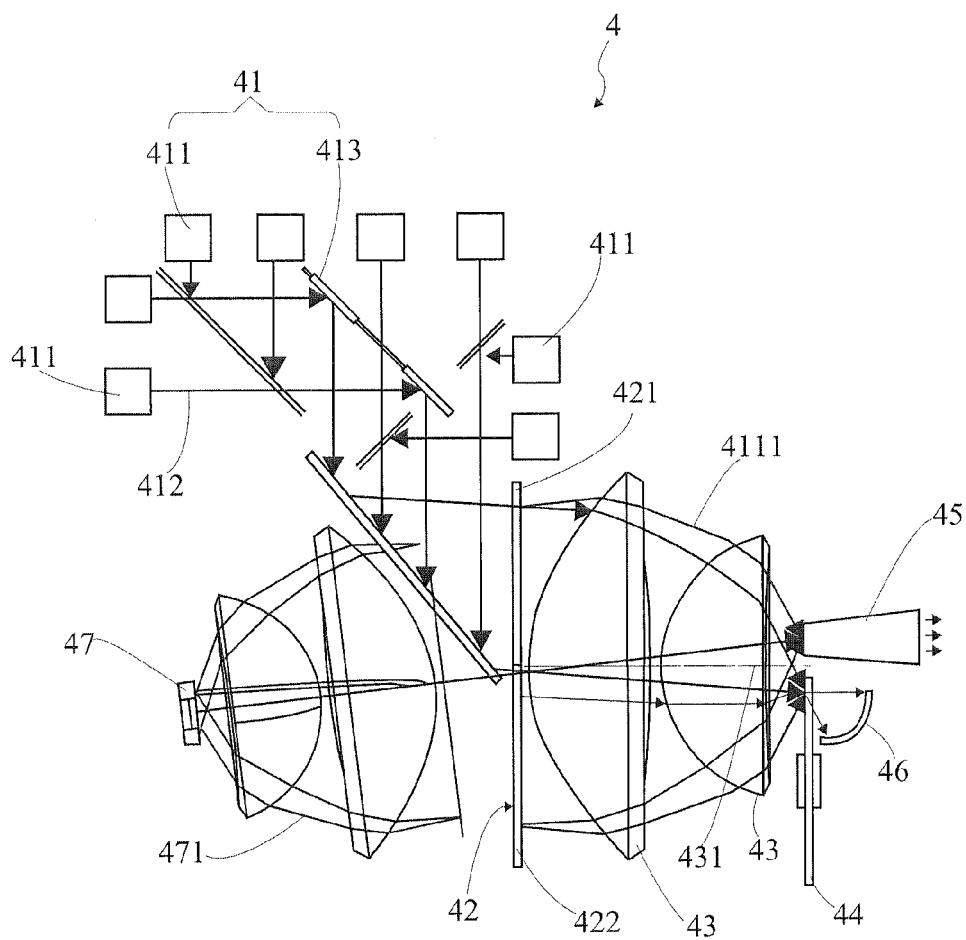
FIG. 6 is a schematic view of a projection device according to the second embodiment of the present invention.

The second embodiment of the present invention is an illumination system 4 for use in a projection device (not shown), a schematic view of which is shown in FIG. 6. The projection device comprises the illumination system 4 and an imaging system (not shown). The illumination system 4 of the projection device is adapted to provide a light and output the light to the imaging system so that the imaging system forms the light into an image for display. The illumination system 4 according to the second embodiment of the present invention comprises a first light source 41, a dichroic element 42, two light condensing elements 43, a rotary wheel 44, a light integrating element 45, a light recycling element 46 and a second light source 47. The elements of this embodiment are similar to those of the previous embodiment, and are detailed as follows.

Also with reference to FIG. 4, the first light source 41 comprises a plurality of blue laser light sources 411 and a plurality of reflecting mirrors 413, and is adapted to provide a plurality of first wave band lights 412 within the blue wave band. Similarly, to enhance the light intensity of the first wave band lights 412, the first light source 41 also adopts a design similar to that of the first light source 31 of the previous embodiment.

The second light source 47 comprises a red light emitting diode (LED) for providing a third wave band light 471 within the red wave band.

The dichroic element 42 has a first dichroic portion 421 and a second dichroic portion 422. The first dichroic portion 421 allows the first wave band lights 412 and the third wave band light 471 to pass therethrough but reflects a second wave band light 4111. The second dichroic portion 422 allows the third wave band light 471 to pass therethrough but reflects the first wave band lights 412 and the second wave band light 4111. The second wave band light 4111 in this embodiment is within the green wave band. In other words, the first wave band lights 412 (blue lights) directly pass through the first dichroic portion 421 or are reflected by the second dichroic portion 422 when being projected to the dichroic element 42; the second wave band light 4111 (green light) is reflected by both the first dichroic portion 421 and the second dichroic portion 422 when being projected to the dichroic element 42; and the third wave band light 4112 (red light) directly passes through the first dichroic portion 421 and the second dichroic portion 422 when being projected to the dichroic element 42.

The two light condensing elements 43 have an optical axis 431 in common; and in this embodiment, each of the light condensing elements 43 is a convex lens. In other embodiments of the present invention, there may be another number of light condensing elements and the light condensing elements may be of various forms or made of various materials as will be readily appreciated by people skilled in the art.

Figure 7:
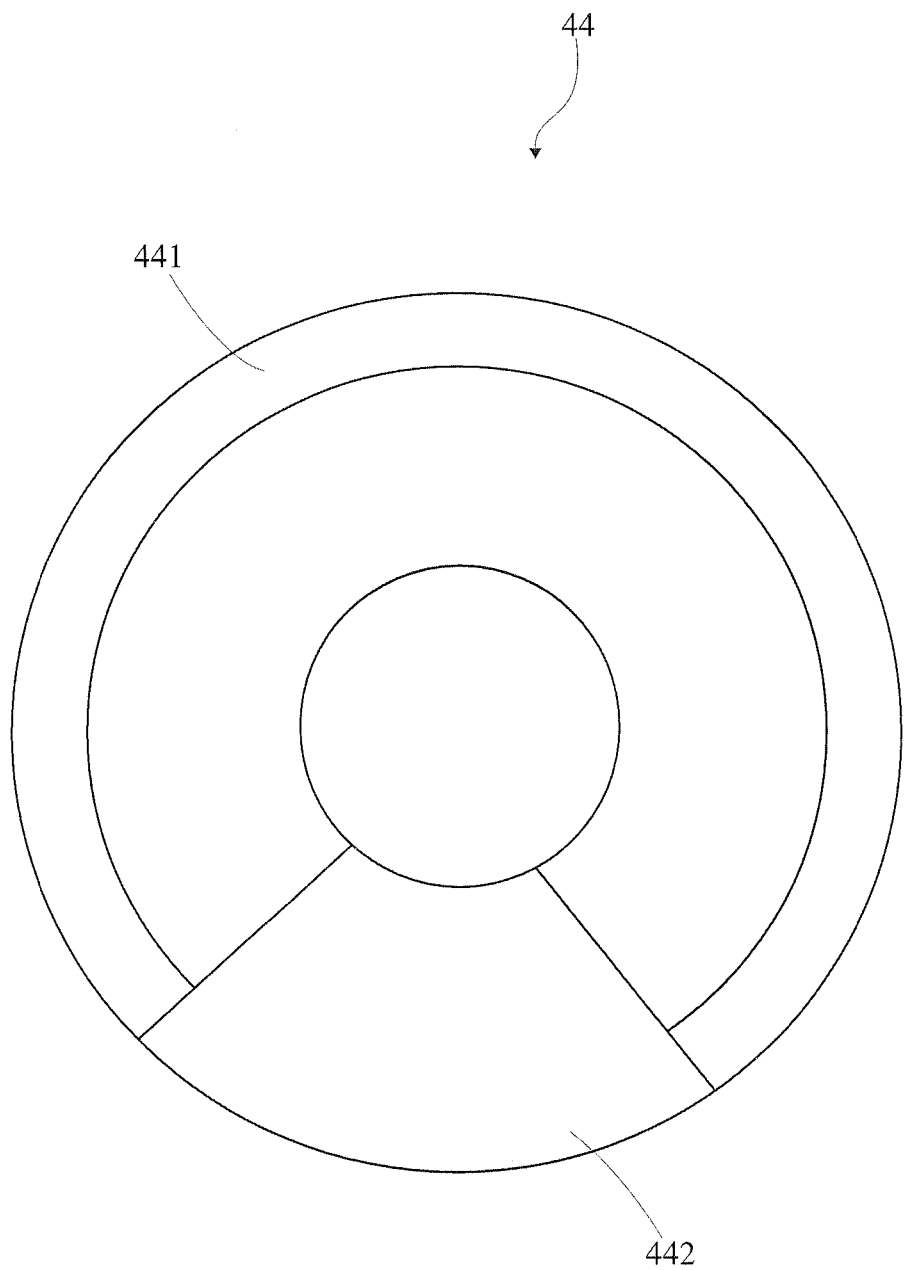
FIG. 7 is a schematic view of a rotary wheel of the projection device according to the second embodiment of the present invention.

Again, with reference to FIG. 7, the rotary wheel 44 is disposed on the first side of the optical axis 431. The rotary wheel 44 comprises a circular glass sheet, and has a wave band transforming area 441 and a reflecting area 442 defined on the surface thereof. The wave band transforming area 441 is formed by coating a green phosphor material on the glass surface, and is adapted to transform each of the first wave band lights 412 into the second wave band light 4111. On the opposite side of the glass in this area is a coating film for transmitting the first wave band lights 412 therethrough and reflecting the second wave band light 4111. The reflecting area 442 is adapted to reflect the first wave band lights 412. The second wave band light 4111 that is obtained through transformation, and the first wave band lights 412 that are reflected are all focused by the light condensing elements 33. An area of the wave band transforming area 441 and an area of the reflecting area 442 are related to a duty cycle of the second light source 47. In the present invention, the reflecting area may be formed by coating a reflective material, or may be made directly of a reflecting mirror.

The light integrating element 45 is disposed on the second side of the optical axis 431, and the light integrating element 45 and the rotary wheel 44 are optically conjugate about the optical axis 431. More specifically, an entrance (not shown) of the light integrating element 45 is optically conjugate to a light focusing portion of the rotary wheel 44, and the light focusing portion is one of the wave band transforming area 441 and the reflecting area 442. The light integrating element 45 may be a light tunnel or a light integration rod.

Hereinafter, the operation mechanism of the illumination system 4 of this embodiment will be described in detail.

If, when the first light source 41 is in an ON status and the second light source 47 is in an OFF status, the first wave band lights 412 emitted by the blue laser light sources 411 of the first light source 41 are all guided by the reflecting mirrors 413 into the same direction and pass through the first dichroic portion 421 of the dichroic element 42 to be focused by the light condensing elements 43 onto the reflecting area 442 of the rotary wheel 44, then the first wave band lights 412 are reflected by the reflecting area 442 to pass through the light condensing elements 43 and are then reflected by the second dichroic portion 422 of the dichroic element 42. Afterwards, the first wave band lights 412 are focused by the light condensing elements 43 onto the light integrating element 45 for homogenization. Finally, the homogenized first wave band lights 412 are provided by the light integrating element 45 to the imaging system for imaging.

The rotary wheel 44 and the light integrating element 45 are optically conjugate about the optical axis 431, and the first wave band lights 412 provided by the blue laser light sources 411 have a small divergence angle and are concentrated. Therefore, after passing through the light condensing elements 43, the first wave band lights 412 reflected by the reflecting area 442 of the rotary wheel 44 do not travel towards the first dichroic portion 421 but are only reflected by the second dichroic portion 422 and are then focused onto the light integrating element 45 being optically conjugate to the rotary wheel 44. In other words, the first wave band lights 412 focused on the reflecting area 442 is optically conjugated to the first wave band light 412, which is later focused on the entrance of the light integrating element 45.

Similarly, if, when the first light source 41 is in the ON status and the second light source 47 is in the OFF status, the first wave band lights 412 emitted by the blue laser light sources 411 of the first light source 41 are all guided by the reflecting mirrors 413 into the same direction and pass through the first dichroic portion 421 to be focused by the light condensing elements 43 onto the wave band transforming area 441 of the rotary wheel 44, then each of the first wave band lights 412 is transformed into the second wave band light 4111. The second wave band light 4111 then returns through the light condensing elements 43 and is reflected by the first dichroic portion 421 and the second dichroic portion 422 of the dichroic element 42. Afterwards, the second wave band light 4111 is focused by the light condensing elements 43 onto the light integrating element 45 for homogenization. Finally, the homogenized second wave band light 4111 is provided by the light integrating element 45 to the imaging system for imaging. More specifically, the first wave band lights 412 focused on the wave band transforming area 441 is optically conjugated to the second wave band light 4111, which is later focused on the entrance of the light integrating element 45.

As in the previous embodiment, to recycle the light to avoid light loss, a light recycling element 46 for reflecting the first wave band lights 412 passing through the wave band transforming area 441 is disposed behind the rotary wheel 44.

When the first light source 41 is in the OFF status and the second light source 47 is in the ON status, the third wave band light 471 is provided directly by the second light source 47. Specifically, the third wave band light 471 passes through the dichroic element 42 and is focused by the light condensing elements 43 onto the light integrating element 45. Then, the third wave band light 471 is provided to the imaging system for imaging.

Finally, the first wave band lights 412 within the blue wave band, the second wave band light 4111 within the green wave band and the third wave band light 471 within the red wave band are outputted by the light integrating element 45 to the imaging system so that the imaging system forms the first wave band lights 412, the second wave band light 4111 and the third wave band light 471 into an image for projection and display.

The numbers and positions of the elements in the aforesaid embodiments may be adjusted as desired. For example, in the first embodiment, multiple light condensing elements 33 may be additionally provided so that the first wave band lights 312 are concentrated on the rotary wheel 34 to a greater extent; the rotary wheel 34 may also be coated with phosphors of other colors to meet different needs for imaging colors and to make the color more vivid or to increase the luminance. Moreover, the light recycling element 36 may be removed to reduce the manufacturing cost and the volume. In the second embodiment, multiple light condensing elements 43 may be additionally provided so that the first wave band lights 412 are concentrated on the rotary wheel 44 and the third wave band light 471 is focused onto the light integrating element 45 both to a greater extent. A red laser light source is used for the second light source 47 instead to make the third wave band light 471 more concentrated. The rotary wheel 44 may also be coated with phosphors of other colors to make the imaging colors more vivid or to increase the luminance. Moreover, the light recycling element 46 may also be removed.

According to the above descriptions, instead of using a single light source to project light to a color wheel, the illumination system of the present invention uses separate blue laser light sources in combination with wavelength transforming areas that have a red phosphor material and a green phosphor material. The illumination system may also use separate blue laser light sources, a red LED and a wavelength transforming area with a green phosphor material. In this way, the illumination system of the present invention can effectively increase the light intensity thereof while still having a small volume. Furthermore, instead of using a green LED to emit green light, the illumination system of the present invention uses a blue LED in combination with a wavelength transforming area that has a green phosphor material to generate green light; thus, the intensity of the green light is increased, and the low luminous efficiency of the green light encountered with the conventional illumination system is prevented. In this way, the problems with the conventional projection device are significantly improved by means of the illumination system of the present invention.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. An illumination system, comprising:
   a first light source, providing a first wave band light;
   a dichroic element;
   at least one light condensing element, having an optical axis;
   a rotary wheel, having at least one wave band transforming area and a reflecting area and being disposed at a first side of the optical axis; and
   a light integrating element, being disposed at a second side of the optical axis, wherein the light integrating element and the rotary wheel are optically conjugate about the optical axis, and wherein the light integrating element has an entrance which is optically conjugate to a light focusing portion of the rotary wheel,
   wherein the first wave band light is emitted through the dichroic element and the at least one light condensing element, and focuses on the at least one wave band transforming area or the reflecting area,
   when the first wave band light focuses on the at least one wave band transforming area, the first wave band light is transformed into a second wave band light, and the second wave band light is focused on the light integrating element by the at least one light condensing element,
   when the first wave band light focuses on the reflecting area, the first wave band light is reflected by the reflecting area, and is focused on the light integrating element by the at least one light condensing element.

2. The illumination system as claimed in claim 1, wherein the light focusing portion is the at least one wave band transforming area or the reflecting area.

3. The illumination system as claimed in claim 2, wherein the first light source comprises a plurality of blue laser light sources, and the first wave band light is a blue light.

4. The illumination system as claimed in claim 3, wherein the first light source further comprises a plurality of reflecting mirrors.

5. The illumination system as claimed in claim 3, wherein the second wave band light is a green light.

6. The illumination system as claimed in claim 5, wherein the at least one wave band transforming area comprises a first wave band transforming area and a second wave band transforming area, the first wave band light is transformed into the second wave band light when being focused on the first wave band transforming area, and the first wave band light is transformed into a third wave band light when being focused on the second wave band transforming area.

7. The illumination system as claimed in claim 6, wherein the third wave band light is a red light.

8. The illumination system as claimed in claim 7, wherein the dichroic element comprises a dichroic portion and a reflecting portion, the dichroic portion allows the first wave band light to pass therethrough and reflects the second wave band light and the third wave band light, and the reflecting portion reflects the first wave band light, the second wave band light and the third wave band light.

9. The illumination system as claimed in claim 8, wherein the at least one light condensing element focuses the first wave band light, passing through the dichroic portion, onto the at least one wave band transforming area or the reflecting area, and focuses the second wave band light and the third wave band light, reflected by the dichroic portion, and the first wave band light, the second wave band light and the third wave band light, reflected by the reflecting portion, onto the light integrating element.

10. The illumination system as claimed in claim 9, wherein the at least one light condensing element comprises two light condensing elements, and each of the light condensing elements is a convex lens.

11. The illumination system as claimed in claim 6, wherein the first wave band transforming area and the second wave band transforming area are coated with a green phosphor material and a red phosphor material respectively.

12. The illumination system as claimed in claim 6, wherein an area ratio of the first wave band transforming area, the second wave band transforming area and the reflecting area is 3:3:2.

13. The illumination system as claimed in claim 6, wherein the illumination system further comprises a light recycling element, the light recycling element reflects and focuses the first wave band light, passing through the first wave band transforming area, to the first wave band transforming area to be transformed into the second wave band light, and the light recycling element reflects and focuses the first wave band light, passing through the second wave band transforming area, to the second wave band transforming area to be transformed into the third wave band light.

14. The illumination system as claimed in claim 5, further comprising a second light source for providing a third wave band light.

15. The illumination system as claimed in claim 14, wherein the second light source comprises a plurality of red light emitting diodes (LEDs), and the third wave band light is a red light.

16. The illumination system as claimed in claim 15, wherein the illumination system further comprises a light recycling element, and the light recycling element reflects and focuses the first wave band light, passing through the at least one wave band transforming area, to the at least one wave band transforming area to be transformed into the second wave band light.

17. The illumination system as claimed in claim 15, wherein the dichroic element has a first dichroic portion and a second dichroic portion, the first dichroic portion allows the first wave band light and the third wave band light to pass therethrough and reflects the second wave band light, and the second dichroic portion allows the third wave band light to pass therethrough and reflects the first wave band light and the second wave band light.

18. The illumination system as claimed in claim 17, wherein the at least one light condensing element focuses the first wave band light, passing through the first dichroic portion, onto the at least one wave band transforming area or the reflecting area, and the at least one light condensing element focuses the second wave band light, reflected by the first dichroic portion, the first wave band light and the second wave band light, reflected by the second dichroic portion, and the third wave band light onto the light integrating element.

19. The illumination system as claimed in claim 18, wherein the at least one light condensing element comprises two light condensing elements, and each of the light condensing elements is a convex lens.

20. The illumination system as claimed in claim 14, wherein the at least one wave band transforming area is coated with a green phosphor material.

21. The illumination system as claimed in claim 14, wherein an area of the at least one wave band transforming area and an area of the reflecting area are related to a duty cycle of the second light source.

22. The illumination system as claimed in claim 1, wherein the light integrating element is a light tunnel or a light integration rod.

23. A projection device, comprising:
an illumination system as claimed in claim 1, providing a light beam; and
an imaging system, forming an image with the light beam provided by the illumination system.

24. The projection device as claimed in claim 23, wherein the light beam comprises a first wave band light, a second wave.

\* \* \* \* \*